United States Patent [19]

Von Kohorn

[11] Patent Number: 4,788,905

[45] Date of Patent: Dec. 6, 1988

[54] COMBINATION COOKING, EATING AND VENTILATING SYSTEM

[76] Inventor: Henry Von Kohorn, 215 Rocky Rapids Rd., Stamford, Conn. 06903

[21] Appl. No.: 60,768

[22] Filed: Jun. 10, 1987

[51] Int. Cl.$^4$ ............................................. A47J 37/07
[52] U.S. Cl. ....................................... 99/357; 99/450; 126/25 R; 98/36
[58] Field of Search ................ 99/357, 339, 352, 422, 99/447, 450; 126/25 R, 25 A, 121, 299 D; 98/36

[56] References Cited

U.S. PATENT DOCUMENTS

| | | | |
|---|---|---|---|
| 2,094,915 | 10/1937 | Dawson | 126/25 R |
| 3,303,839 | 2/1967 | Tavan | 126/299 D |
| 3,327,697 | 6/1967 | Berlant | 126/25 R |
| 3,327,698 | 6/1967 | Leslie | 126/25 R |
| 3,474,725 | 10/1969 | McClaren | 99/447 |
| 3,491,744 | 1/1970 | Von Kohorn et al. | 99/450 |
| 3,745,303 | 7/1973 | Epperson et al. | 99/450 |
| 4,551,600 | 11/1985 | Miyagawa et al. | 126/299 D |

*Primary Examiner*—Henry J. Recla
*Assistant Examiner*—Linda J. Sholl
*Attorney, Agent, or Firm*—Parmelee, Bollinger & Bramblett

[57] ABSTRACT

A barbeque arrangement is provided which combines the cooking, eating and ventilating function of the system. The system contains an open fire grill surrounded by an unperforated griddle, both of which are surrounded by an eating counter. A fan is positioned below the cooking grill and griddle which forces the air upward between the eating counter and the griddle in the shape of an air curtain for removing hot smoking air from the cooking area and at the same time through ventilation provides a cooling effect for the users seated around the eating counter.

2 Claims, 5 Drawing Sheets

COMBINATION COOKING, EATING AND VENTILATING SYSTEM

BACKGROUND OF THE INVENTION

The present invention relates to a barbecue system combining cooking, eating and ventilating means. The arrangement of the elements forming the system permits a group of people, including the host and guests, to be seated about the periphery thereof and to cook and eat their meals in comfort, and particularly to permit the host to remain seated with his guests without having to walk back and forth, to and from the barbecue. According to the present invention each user of the barbecue may individually cook his or her own food and eat the same on an eating counter or a shelf-like table surrounding the cooking area within easy reach of the grill and the griddle forming part of the system.

A barbecue disclosing an arrangement having a similar configuration is disclosed in U.S. Pat. No. 3,491,744. Said barbecue, however, was found to have a drawback in that persons seated around said barbecue were not sufficiently protected from the heat and smoke generated in the cooking. The fan arrangement disclosed in said patent pulls the hot, smoky air from the cooking area upwardly in a turbulent stream which tends to engulf the persons seated about the barbecue. This drawback is eliminated by the present system employing an air flow principle which, through ventilation, creates cooling comfort for the users of the barbecue, particularly in hot weather.

Accordingly, it is an object of the present invention to provide a pleasant environment for the use of a combination cooking and eating device with a central, open-fire cooking means and a surrounding metal hot plate or griddle means, both of which are surrounded by an eating counter.

It is a further object of the present invention to design the overall dimensions of the system so that all elements are within easy reach of the individuals seated around its eating counter, while protected from the heat and smoke of the cooking apparatus. As a result, the users of the barbecue system may carry on conversations in comfort despite the proximity of said cooking means.

It is another object of the invention to provide a flexible seating and eating arrangement capable of accommodating varying number of users of the barbecue.

SUMMARY OF THE INVENTION

The system according to the present invention achieves these objects through the use of a controlled and defined air curtain separating the cooking area from the persons seated about the eating counter of the system. A protective air curtain created by the positive displacement and upward movement of the air has been demonstrated to be much more efficient than the suction effect of a fan mounted above the grill. According to the present invention, I provide a fan below the cooking means, such as gas burners, electric heating coils, or charcoal briquettes. Such a fan pulling in air from below and expelling it upwardly serves two separate functions.

In the present system, the controlled air intake of the central fan results in a centripetal flow of the air past the legs of the participants below the eating counter. It has also been discovered that the creating of a controlled and protective air curtain between the cooking elements and the users of the barbecue greatly enhances their comfort and is superior to the drawing off of smoke and heat in the more turbulent manner of an overhead fan. The utilization of a defined air curtain on all sides of the cooking apparatus creates an interdictive air wall which prevents heat and smoke from reaching the users of the barbecue system. The rising air current pulls heat and smoke upwardly and dissipates the same into the atmosphere above the system.

The invention also permits the utilization of a second ventilating and cooling air stream past the users of the barbecue. This is achieved by diverting a portion of the air forced into a plenum chamber and centrifugally expelling it through openings provided in the wall of such plenum chamber at a height approximately corresponding to the torsos of the persons seated about the barbecue. Thus the air drawn into the lower part of the system may serve three separate and beneficial uses. One is the creation of an interdictive and protective air curtain above the cooking area. Another is the two-fold cooling effect of the air drawn into the system in a centripetal direction past the legs of the users and partially expelled in a centrifugal direction past the upper bodies of the users.

DETAILED DESCRIPTION OF THE INVENTION AND DRAWINGS

Figure 1:
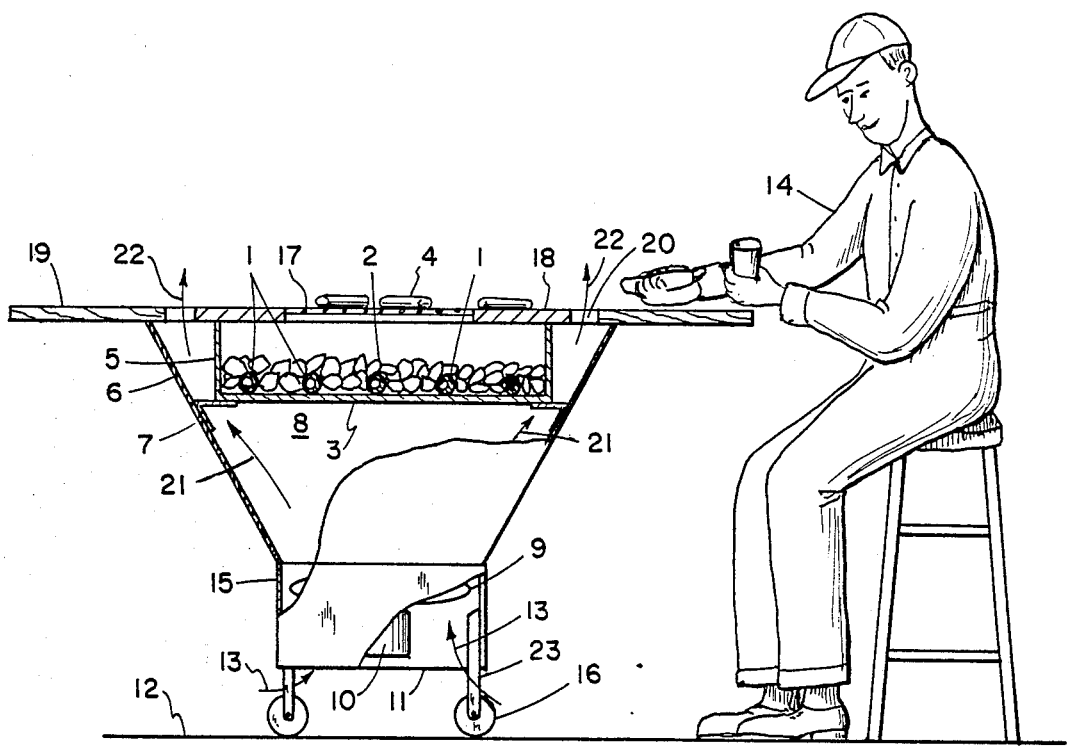
FIG. 1 is a diagrammatic vertical cross-section of a barbecue system having a round or rectangular plenum chamber wall supporting the grill, griddle and eating counter.

The system according to the present invention comprises the elements of a cooking apparatus, an eating counter surrounding said cooking apparatus and means to force outside air into the system for purposes of ventilation. Although such air may be conducted into the system through ducts, for purposes of this illustration a fan is provided on or near the floor on which the system rests. Such fan may be enclosed in a suitable housing, including a variable speed motor and appropriate electrical connections and controls. A plenum chamber formed by a housing is provided above said fan and may have straight or rounded walls. The upper edge of said housing normally supports an eating counter having such peripheral dimensions as may be necessary to accommodate the desired number of users of the barbecue. The eating counter may also be supported by other means.

Above said fan and central to said eating counter are an inner open-fire grill surrounded by a substantially unperforated griddle. The griddle and the eating counter are dimensioned so as to leave a space between them, said space being accessible to air rising through said housing. Below said open-fire grill and below at least the inner portions of the griddle appropriate heat generating means are provided. These may consist of gas burners, electric elements or a support for solid fuel. Such support may take the form of a tray which can serve as a drip pan and may also take the form of a box to contain charcoal or synthetic briquettes. The heat generating means are appropriately supported by any known means and may, in turn, be supported by said housing. The cooking apparatus formed by these elements may also be supported independently, such as by legs resting on the floor.

Air drawn in by the fan and expelled upwardly is essentially contained by said housing wall and is forced to escape under positive pressure through the spacing between said griddle and eating counter. As a result, a well defined air curtain is created between said griddle and eating counter, which air curtain prevents the heat and smoke generated by the cooking elements from reaching the participants seated around the eating counter.

Alternatively, an additional air current may be caused to flow out of said housing by providing openings in the wall and between the upper and lower ends of said housing, permitting air to escape in a centrifugal direction.

It will thus be evident that three air currents can be created by the present method, including a centripetal current near the floor, a centrifugal current below the eating counter and a vertical air current rising from the cooking surface.

The air curtain may be controlled by regulating the pressure under which said fan forces the air upwardly through said spacing. In order to increase the height and effectiveness of the air curtain the fan speed is increased. It is not necessary, however, that the system be airtight and leakage of air between the plenum chamber and the cooking area is not significant. The plenum chamber may be provided with appropriate air baffles to deflect the air in the desired direction and so as to minimize resistance to the air flow.

FIG. 1 is a cross-sectional view of the barbecue system disclosing three principal groups of components consisting of the cooking apparatus, the eating counter and the ventilating means. The cooking means comprise gas burners 1, surrounded by synthetic briquettes 2. Gas burners are shown in the drawings for purposes of illustration, it being understood that other forms of generating heat for cooking may be employed, including electric heating coils and charcoal briquettes.

Gas burners 1 rest on or are supported by shelf 3, which shelf 3 may also serve as a tray for briquettes 2 and as a catch pan for drippings from food 4 If, for instance, synthetic briquettes are used, shelf 3 is provided with side walls 5 and rests removably on brackets 7. Gas burners 1 are suitably connected to an outside gas supply, such as through flexible hoses which permit removing shelf 3 along with gas burners 1.

Wall 6 and shelf 3 form a housing 8 serving as a plenum chamber at the lower end of which electric fan 9 is mounted. Fan 9 is driven by a multi-speed motor 10, which rests on a grill or screen 11 and is suitably connected to an outside source of power. The blades of fan 9 revolve so as to draw air in between it and floor 12 in the direction of arrow 13 indicating the flow of air in a cooling manner past the legs of the persons 14 seated around the barbecue. Fan 9 and motor 10 are mounted in box 15, supported by legs 23 and casters 16.

Perforated grill 17 and substantially unperforated griddle 18, which are rigidly connected or made of one piece, are supported by side wall 5 of the box-like shelf 3 or may rest on other suitable support means. Grill 17 and griddle 18 may consist of one sheet of stainless steel in which the central portion is provided with a plurality of holes or slots of a size permitting open-fire cooking of food to be grilled, such as meat. The outer portion of said sheet is not perforated and serves as a hot plate or griddle for liquid ingredients, such as eggs or for food to be fried rather than grilled Each one of the persons 14 using the barbecue is separated from the cooking area by the width of the eating counter 19 and protected from the heat and smoke of cooking by the air curtain 22 rising around the cooking area. Each person 14 is able to reach the cooking area and to cook his or her own food without having to leave his or her seat. As a result, each person may individually select the preferred kind of food, the cooking time, seasoning, the timing of a second helping and the like, which choices are severely limited when one host must serve a number of guests.

Surrounding grill 17 and griddle 18 is eating counter 19, which rests on the upper edge of wall 6. Other support means may be provided for eating counter 19. The inside dimensions of heating counter 19 and the outside dimensions of griddle 18 are chosen so that a space is created between them. This spacing 20 between griddle and counter normally is 5 to 30 millimeters wide.

The air drawn into fan 9 in the direction of arrow 13 is blown into plenum chamber 8 in the direction of arrow 21. The positive pressure created in plenum chamber 8 by fan 9 forces the air to escape upwardly through spacing 20 in the direction of arrow 22. Because the passage of air through spacing 20 is relatively restricted, the velocity of the upward air movement through spacing 20 is increased. It can be controlled by adjusting the speed of fan 9. The resulting air curtain flowing rapidly upwardly from spacing 20 serves two functions. It prevents the outward spread of the heat and smoke generated in the cooking, thus serving as an interdictive curtain and it sucks heat and smoke upwardly, dissipating them into the atmosphere.

Figure 2:
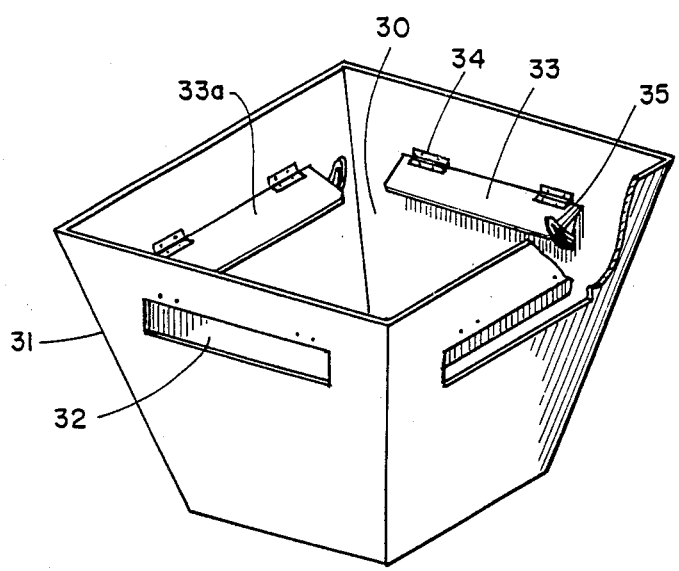
FIG. 2 is a perspective view of a rectangular embodiment of the plenum chamber of the system having openings with covers which can serve as air deflectors.

FIG. 2 shows in perspective a housing 30 forming a plenum chamber which is open at the top and bottom. It comprises walls 31 cut and joined so as to form an inverted, truncated pyramid. Walls 31 are provided with slots or openings 32. Openings 32 can be closed from the inside of housing 30 by covers 33 which can also serve as air baffles or deflectors Said covers 33 are rotatably mounted on hinges 34 and can be locked in place by fasteners 35 or any other positioning means. When locked in place so as to extend inwardly into the housing 30, as illustrated by the position of cover 33 a, such cover deflects a portion of the rising air outwardly through opening 33 in wall 31 in a centrifugal fashion.

Because housing 30 is open at the bottom, a stand with legs or other support means for the heat generating and cooking means can be positioned inside the housing. Alternatively, brackets may be mounted on the inside of said housing walls 31 to support the cooking apparatus. It is not necessary that the housing of the fan forms an airtight seal with said housing 30. In FIG. 2, typical positioning means 35 are shown as curved slotted guides mounted on the inside of walls 31. A pin fastened to cover 33 having a set screw at the other end can slide in the slotted guide and can be locked into position by tightening the set screw.

Figure 3:
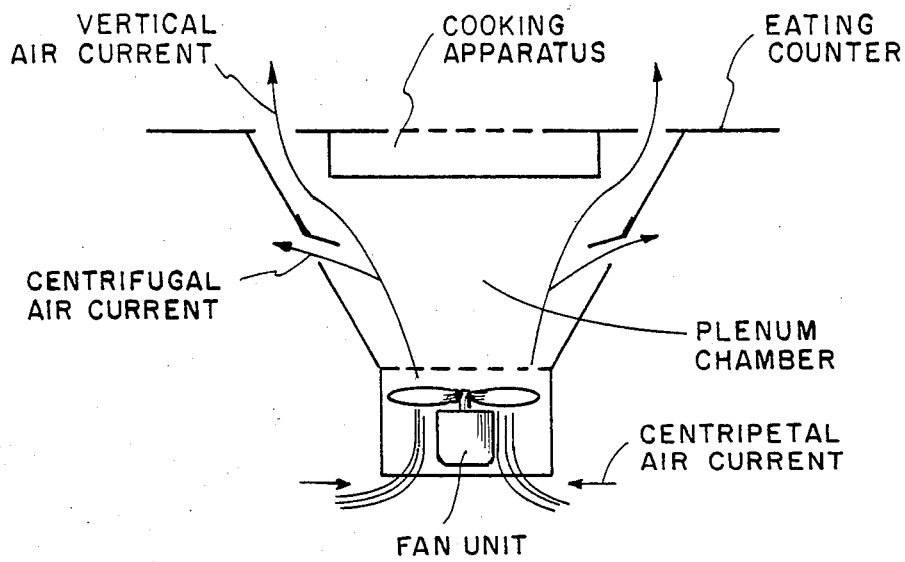
FIG. 3 is a diagram of the air flow employed in the system.

FIG. 3 is a flow diagram of the air streams generated in accordance with the present invention. Air is centripetally drawn into the plenum chamber by the fan unit at the lower end of the plenum chamber housing. It flows past the legs of the persons sitting around the barbecue system. A portion of the air may, if desired, be expelled through openings provided in the housing walls. The centrifugal air flow through these openings past the upper body of the person sitting around the eating counter may be regulated by means of the baffles shown in FIG. 2 which may also be positioned so as to close the openings. The air flowing towards the upper part of the housing escapes under pressure through the spacing between the griddle of the cooking apparatus and the eating counter in the form of the rising air curtain shown in FIG. 1. Its escape through the perforated grill is prevented by the walls of the box below the heat generating means.

Thus, according to the present invention, comfort cooling is achieved by the method which comprises in combination a centripetal air current near the floor and an air current vertically rising from the cooking surface, as well as an optional centrifugal air current between the floor and the eating counter; the first and third of said currents flowing past the users of the barbecue system provide comfort cooling and the second current produces a protective air curtain which also removes heat and smoke.

Figure 4:
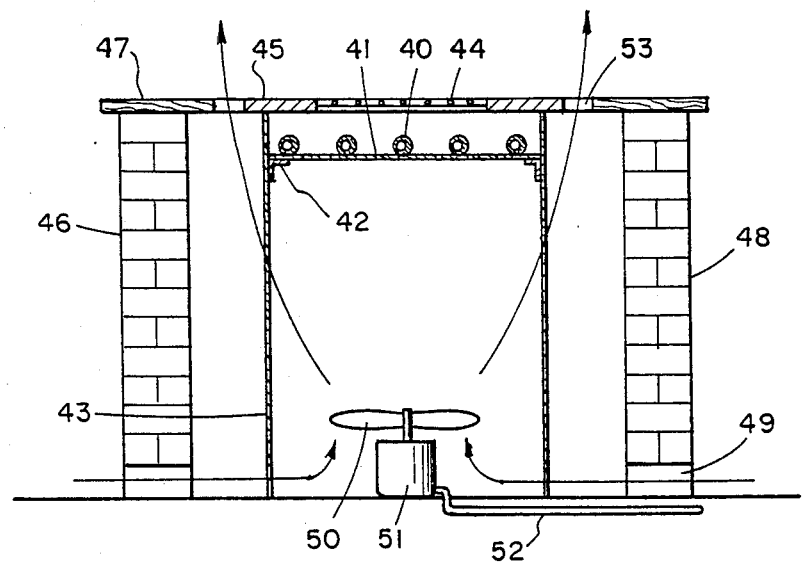
FIG. 4 is a diagrammatic vertical cross-section of a system having a separate plenum chamber wall supporting the eating table and separate support means for grill and griddle.

In FIG. 4, the cooking apparatus comprising gas burners 40 surrounded, when desired, by briquettes. It rests oh shelf 41 supported by brackets 42. Legs 43 support brackets 42 and may also support grill 44 and griddle 45. Instead of gas burners 40, charcoal briquettes may be used. Food drippings are caught by pan or box 41. The eating counter 47 rests on uprights or wall 48, which wall consists of heat insulating material, such as bricks 46. Wall 48 has openings 49 near the bottom serving as air intakes. Legs 43 do not impede the flow of air. If it is desired to direct ventilation at the upper part of the persons sitting around the barbecue, one or more bricks of wall 48 may be omitted or removably inserted at the appropriate level. Fan 50 is driven by variable speed motor 51 wired through conduit 52. Air is drawn into the system through the air intakes 49 of the walls 48 surrounding the barbecue and is forced upwardly by fan 50. It passes between legs 43 towards the eating area and is expelled under pressure through spacing 53 between griddle 45 and eating counter 47. When desired, lips extending down from the outer edge of griddle 45 and the inner edge of counter 47 are provided to conduct air towards, and to ensure a smoother flow of air into and through, spacing 53.

Figure 5:
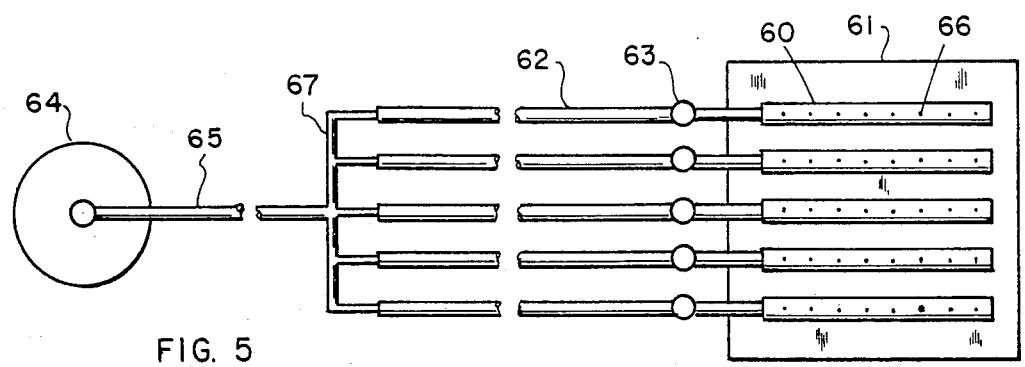
FIG. 5 is a diagrammatic top-plan view of the cooking elements comprising gas burners in a square configuration.

FIG. 5 depicts a preferred embodiment of the heat generating means comprising gas burners 60 having perforations 66 and resting on shelf 61 which may also support synthetic briquettes. Each of the gas burners 60 is provided with appropriate controls, such as control valves 63 capable of regulating the flow of fuel, such as propane gas, from bottle 64 through pipe 65. Provisions for the admixture of air to the gas are provided as required The manifold 67 distributes the gas through flexible hoses 62 to burners 60 through controls 63. The flexible gas connection shown permits lifting the entire burner arrangement including shelf 61 out of the barbecue.

Figure 6:
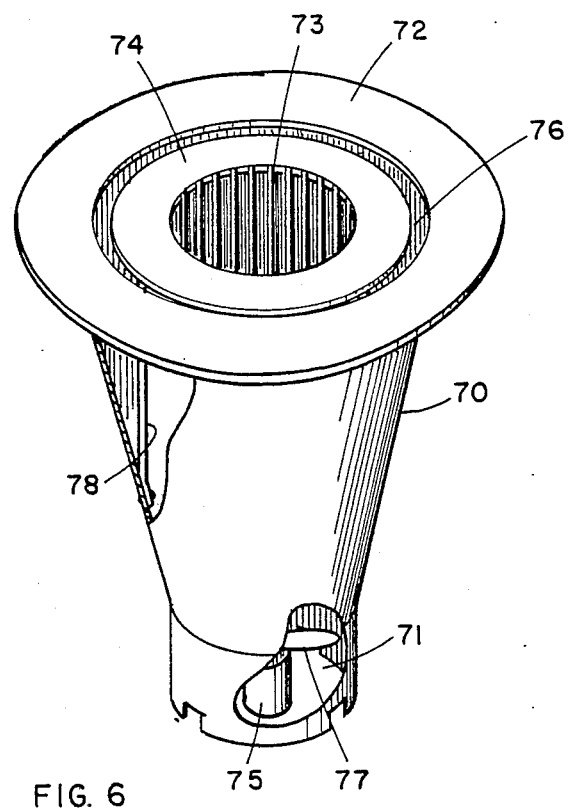
FIG. 6 is a perspective view of a round housing forming the plenum chamber and supporting a round eating center.

FIG. 6 depicts a plenum chamber having a housing 70 in the shape of an inverted, truncated cone, which is joined at the bottom to fan chamber 71 containing fan 77 and electrical motor 75. The upper edge of circular housing 70 supports circular eating counter 72. The cooking apparatus including the heat generating means may be supported by arms 78 shown in dotted lines, mounted in housing 70 or by any other means, including legs resting on the floor. Such arms or other means fastened to the inside of housing 70, support the grill 73 and the griddle 74, as well as the shelf (not shown) for the gas burners, electric elements or charcoal.

Spacing 76 between griddle 74 and eating counter 72 cause the air forced upwardly under pressure from fan 77 in fan chamber 71 to escape upwardly forming a clearly defined air curtain.

The inner edge of eating counter 72 and the outer edge of griddle 74 are suitably shaped to minimize resistance to the flow of air and aid in the formation of a clearly defined air wall. The vertical cross section of said spacing 76 may, for example, have at its lower air intake portion the shape of a Venturi tube.

Figure 7:
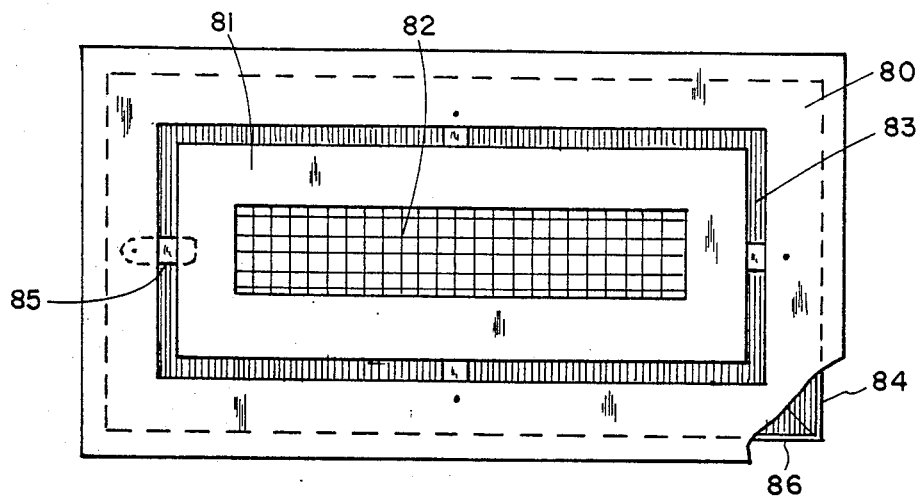
FIG. 7 is a top-plan view of a rectangular grill and griddle in spaced relationship to a rectangular eating counter.

FIG. 7 shows a rectangular configuration of eating counter 80, griddle 81 and grill 82 in diagrammatic top plan view. Eating counter 80 and griddle 81 are separated by spacing 83. The upper edge of the plenum chamber housing supporting the eating counter 80 is shown in dotted lines 86, as are swivel arms 85 mounted below and extending inwardly from eating table 80. Swivel arms 85 support griddle 81 and central grill 82 rigidly joined thereto.

Figure 8:
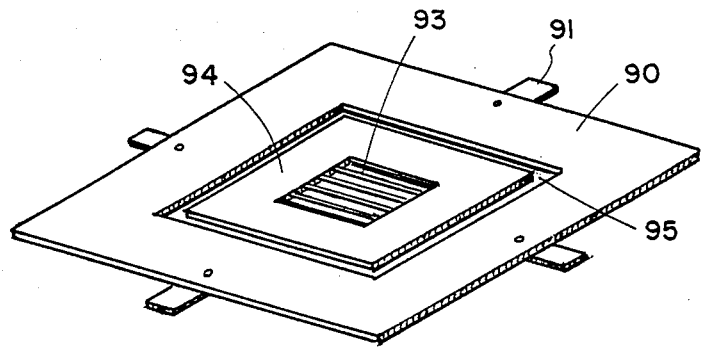
FIG. 8 is a perspective view of a square embodiment of the grill and griddle in spaced relationship to an inner eating counter having swivel arms for the support of an outer eating counter.
Figure 9:
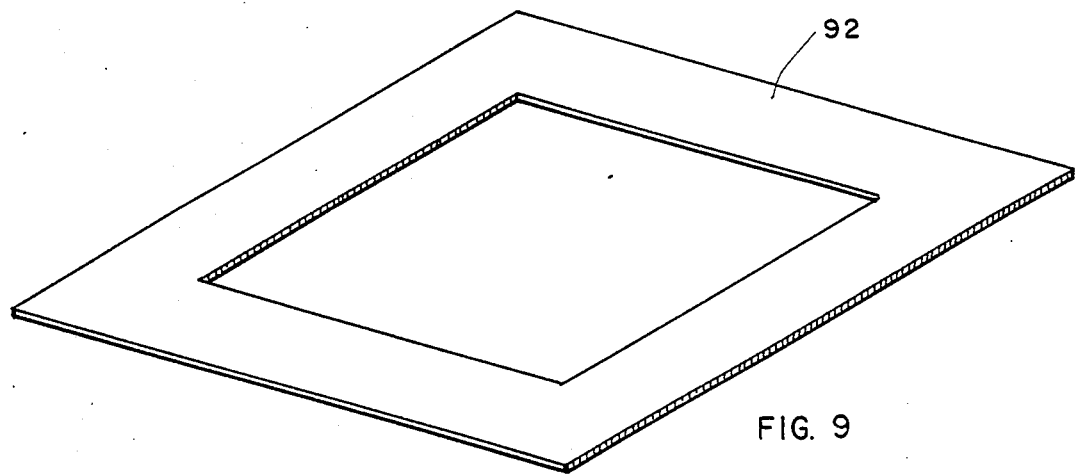
FIG. 9 is a perspective view of an outer eating counter adapted to surround an inner eating counter to accomodate a larger group of users.

FIG. 8 shows in perspective an inner eating counter 90 to the underside of which are fastened swivel arms 91. Arms 91 may be rotated so as to be concealed below counter 90, in which case the users of the barbecue system, say 8 persons, are seated around counter 90. The protective air curtain described rises through spacing 95 between griddle 94 and eating table 90. If it is desired to seat a larger number of guests, say 12, around the barbecue system, the swivel arms 91 are rotated to extend outwardly as shown in FIG. 9 and outer eating counter 92 shown in perspective in FIG. 9 is placed on swivel arms 91. The inner dimensions of the outer eating counter 92 shown in FIG. 9 are such as to fit around the outer dimensions of the inner eating counter 90 shown in FIG. 8. It is obvious that the use of the outer counter 92 shown in FIG. 9 increases the peripheral dimension of the counter space and with it the number of persons who can be seated around the barbecue system. In either case, the users can easily reach grill 93 and griddle 94 using, if necessary, a long fork and spatula. When handling food on the cooking apparatus, users of the barbecue can easily pierce the air curtain for the short duration of such food manipulation.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A barbeque cooking, eating and ventilating system intended for use by a plurality of persons seated in close proximity to and on all sides of said system, comprising:

a cooking apparatus having a central perforated grill, a substantially unperforated griddle surrounding said grill, heat generating means disposed below and extending under said grill and at least part of said griddle, and shelf means disposed below said heat generating means, an eating counter substantially surrounding said cooking apparatus, a spacing between said griddle and said eating counter, support means for said cooking apparatus and said eating counter, and an apparatus for providing threefold ventilation and comfort cooling to persons seated around said system, comprising:

an electrically driven fan centrally disposed below said cooking apparatus, a plenum chamber centrally disposed between said seated persons and between said fan and said cooking apparatus, said plenum chamber being formed by vertically extending walls having upper ends terminating below said eating counter, said plenum chamber being adapted to receive air blow upwardly by said fan, an intake means connected to said fan and adapted to centripetally draw air into said system from all sides at a level so as to cause said air to flow in a cooling manner past the legs of the persons seated on all sides of the barbeque system, openings in the wall of said plenum chamber having means for the regulated lateral escape and centrifugal flow of air in a cooling manner below the eating counter past the torsos of the persons seated on all sides of said barbeque system, and means for deflecting said upwardly blow air toward and through said spacing, so as to create a defined air curtain rising from said spacing on all sides of said cooking apparatus, said air curtain drawing heat and smoke generated by the cooking upwardly and insulating the persons seated at said eating counter and surrounding said barbeque system from heat and smoke.

2. The barbeque system according to claim 1, having an encircling seating arrangement adapted to permit persons to sit around said system facing each other while cooking and eating food, wherein each of said persons benefits from said ventilation.

* * * * *